(12) United States Patent
Conner et al.

(10) Patent No.: US 8,636,094 B1
(45) Date of Patent: Jan. 28, 2014

(54) ATTACHABLE BICYCLE TRAILER

(76) Inventors: Thomas C. Conner, Ottawa, IL (US);
Richard C. Persinger, Ottawa, IL (US)

( * ) Notice: Subject to any disclaimer, the term of this patent is extended or adjusted under 35 U.S.C. 154(b) by 723 days.

(21) Appl. No.: 12/766,553

(22) Filed: Apr. 23, 2010

(51) Int. Cl.
    B62K 27/00 (2006.01)
(52) U.S. Cl.
    USPC .......... 180/204; 280/47.26; 280/492
(58) Field of Classification Search
    USPC ................. 280/204, 47.26, 492
    See application file for complete search history.

(56) References Cited

U.S. PATENT DOCUMENTS

| | | | |
|---|---|---|---|
| 3,387,859 A | 6/1968 | McClellan | |
| 3,792,875 A | 2/1974 | Paden | |
| 3,877,723 A | 4/1975 | Fahey et al. | |
| 4,077,646 A | 3/1978 | Watkins | |
| 4,342,467 A * | 8/1982 | Kester | 280/204 |
| 4,756,541 A * | 7/1988 | Albitre | 280/204 |
| 5,020,814 A | 6/1991 | George et al. | |
| 5,054,800 A | 10/1991 | Christensen et al. | |
| 5,067,738 A | 11/1991 | O'Connor | |
| 5,076,600 A | 12/1991 | Fake | |
| 5,098,113 A | 3/1992 | Albitre | |
| 5,123,668 A * | 6/1992 | Ligas | 280/204 |
| 5,242,178 A | 9/1993 | Galasso et al. | |
| D340,429 S | 10/1993 | Smith | |
| 5,261,683 A * | 11/1993 | Kurdziel | 280/204 |
| 5,308,096 A | 5/1994 | Smith | |
| 5,320,371 A | 6/1994 | Levad | |
| D351,575 S | 10/1994 | Fenton et al. | |
| 5,454,577 A | 10/1995 | Bell | |
| 5,979,921 A | 11/1999 | Derven et al. | |
| 6,082,753 A * | 7/2000 | Kotlier | 280/204 |
| 6,409,194 B1 | 6/2002 | Voas | |
| D477,797 S | 7/2003 | McCoy et al. | |
| 6,692,010 B1 * | 2/2004 | Johnson et al. | 280/32.7 |
| 6,796,575 B2 * | 9/2004 | Humes | 280/503 |
| 7,549,661 B2 * | 6/2009 | Jackson et al. | 280/204 |

* cited by examiner

Primary Examiner — Tony Winner
Assistant Examiner — Jacob Knutson
(74) Attorney, Agent, or Firm — Montgomery Patent & Design; Robert C. Montgomery (57) ABSTRACT

A bicycle trailer with a platform and a single pneumatic bicycle tire is herein disclosed. The front of the trailer's platform is supported by a gooseneck-shaped arm extending upward to connect with the seat post of a conventional bicycle, thereby providing clearance for the rear wheel of the bicycle. The connection is made with a quick-connect universal-type joint so that a user can easily hitch and unhitch the trailer. The platform is situated to have a low center of gravity which results in stability and less pedaling effort. The narrow width allows the trailer to traverse narrow paths making it ideal for transporting camping supplies, hunting supplies, school books, equipment to and from sports areas, or groceries from a store.

15 Claims, 6 Drawing Sheets

ATTACHABLE BICYCLE TRAILER

RELATED APPLICATIONS

The present invention was first described in a notarized Official Record of Invention on Jul. 9, 2008, that is on file at the offices of Montgomery Patent and Design, LLC, the entire disclosures of which are incorporated herein by reference.

FIELD OF THE INVENTION

The present invention relates generally to bicycles, and in particular, to a pivoting attachable platform adaptable to existing bicycles for purposes of transporting cargo via the bicycle.

BACKGROUND OF THE INVENTION

Bicycles have constituted a common and popular form of transportation and exercise for hundreds of years. The appeal of bicycles lies in their cheap, environmentally friendly nature, the simplicity of the design, and the ability to experience the outdoors while covering large distances. Whether used primarily for transportation or recreation, there are many accessories which are advantageous to have while riding a bicycle, such as cargo for transportation, beverages for hydration, recreational objects for use at a destination, additional passengers, and the like.

As a result of the simple and efficient nature of bicycles, many conventional models do not provide particularly thorough capabilities for the transportation of anything except for the rider. While many bikes may be provided with small front-mounted baskets or water bottle holders, these are hardly sufficient for a number of applications, most notably that of the transportation of any load of significant weight or volume.

Various attempts have been made to provide bicycle trailer attachments. Examples of these attempts can be seen by reference to several U.S. patents. U.S. Pat. No. 3,387,859, issued in the name of McClellan, describes a trailer for motor bikes. The McClellan apparatus attaches to the rear wheel of a motor bike and provides a small railed surface behind the bike.

U.S. Pat. No. 5,054,800, issued in the name of Christensen et al., describes a bicycle trailer for small children. The Christensen apparatus provides a small enclosure adapted for the transportation of additional passengers.

U.S. Pat. No. 5,320,371, issued in the name of Levad, describes a bicycle cargo trailer. The Levad apparatus is adapted for the secure transportation of long flat cargo such as surf boards, ladders, and the like.

Additionally, ornamental designs for a bicycle trailer exist, particularly U.S. Pat. Nos. D 340,429, D 351,575, D 404,692 and D 477,797. However, none of these designs are similar to the present invention.

While these devices fulfill their respective, particular objectives, each of these references suffer from one (1) or more of the aforementioned disadvantages. Many such apparatuses are not adapted to carry and securely retain various types and shapes of cargo. Also, many such apparatuses are not easily retrofittable to a variety of existing and emerging models of bicycles. In addition, many such apparatuses do not pivot in multiple directions or even at all. Furthermore, many such apparatuses do not provide a method of allowing a user to quickly and easily detach and reattach the apparatus once initially installed. Accordingly, there exists a need for an attachable bicycle trailer without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an attachable bicycle trailer which is retrofittable and suitable for the secure transportation of cargo and which is simple and quick to use and store. Thus, the object of the present invention is to solve the aforementioned disadvantages and provide for this need.

To achieve the above objectives, it is an object of the present invention to comprise a frame, a plurality of hooks, a platform, a pair of hand apertures, a fender, a quick release hinge, a universal joint, a clamping collar, and a wheel. First, second, and third bars connect the frame and hinge, hinge and universal joint, and universal joint and clamp respectively.

Another object of the present invention is to comprise the frame of a perimeter of the platform and a plurality of hooks adapted to receive a fastening cord. The platform is adapted to receive cargo items, and the fastening cord may be passed through and secured to the hooks in order to maintain the cargo at a substantially stable position during transport. The platform is of a height low to the ground in order to avoid small anomalies in terrain while also providing a low center of gravity for the smooth navigation of the cargo.

Yet still another object of the present invention is to comprise a plurality of forks and an axle attached to the forks, with the forks positioned parallel to the first bar. The axle is adapted to couple to the bicycle wheel.

Yet still another object of the present invention is to comprise the quick release hinge of a conventional quick release hinge biased between open and closed positions. The hinge allows a user to quickly engage or disengage the first and second bars with each other.

Yet still another object of the present invention is to further comprise the quick release hinge of first and second flanges coupled to the first and second bars respectively, a rod positioned through the flanges, a cam and cam washer attached to the rod, a hinge pin mated to the flanges, and a spring pin attached to the hinge pin. In this manner, a user can rotate the cam in order to selectively lock or unlock the hinge assembly.

Yet still another object of the present invention is to comprise the universal joint of first and second yokes attached to end portions of the second and third bars, respectively. The universal joint and clamping collar allow the apparatus to pivot and move in concordance with the motion of the bicycle.

Yet still another object of the present invention is to comprise the clamping collar of a plurality of arcuate stationary collars and a cam lever. The stationary collars are adapted to be removably attachable to a conventional bicycle seat portion by actuating the cam lever and selectively motioning the collars into a secure open or closed position.

Yet still another object of the present invention is to comprise a fender adapted to encompass a wheel of the bicycle. The fender is constructed of a weatherproof durable material and positioned so as to protect the cargo from water, debris, and the like which may be sprayed upward by the wheel.

Yet still another object of the present invention is to provide a method of utilizing the device that provides a unique means of quickly and securely attaching the trailer to a bicycle, securely fastening cargo to the platform of the trailer, allowing for pivoting motion of the trailer during transport, and quickly and easily detaching the platform portion of the apparatus if need be.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 A is a close-up view of a quick release hinge 50 depicting a closed state, according to a preferred embodiment of the present invention;

FIG. 4 B is a close-up view of the quick release hinge 50 depicting a deployed state, according to a preferred embodiment of the present invention;

DESCRIPTIVE KEY 10 attachable bicycle trailer
12 first bar
14 second bar
16 third bar
20 frame
24 first bar fastener
25 hook
26 hook fastener
29 fork
30 platform
33 axle
34 axle fastener
35 hand aperture
40 fender
41 fender fastener
50 quick-release hinge
51 cam
52 cam washer
53 rod
54 rod fastener
55 first flange
56 second flange
58 hinge pin
59 spring pin
60 universal joint
62 first yoke
64 second yoke
66 joint
70 clamping collar
71 stationary collar
72 hinge
73 cam lever
80 wheel 87 housing fastening means
90 bicycle
95 seat portion
100 weld

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for an attachable bicycle trailer (herein described as the "apparatus") 10, which provides a means for a removably attachable wheeled platform 30 for hauling large amounts of cargo to a desired location via a conventional bicycle 90. The apparatus 10 comprises a frame 20, a plurality of hooks 25, a platform 30, a pair of hand apertures 35, a fender 40, a quick release hinge 50, a universal joint 60, a clamping collar 70, and a wheel 80. Said apparatus 10 is attached to a rear lower seat portion 95 of a bicycle 90. Said apparatus 10 provides a stable transport for camping supplies, hunting supplies, school books, equipment to and from sports areas, or groceries from a store.

Figure 1:
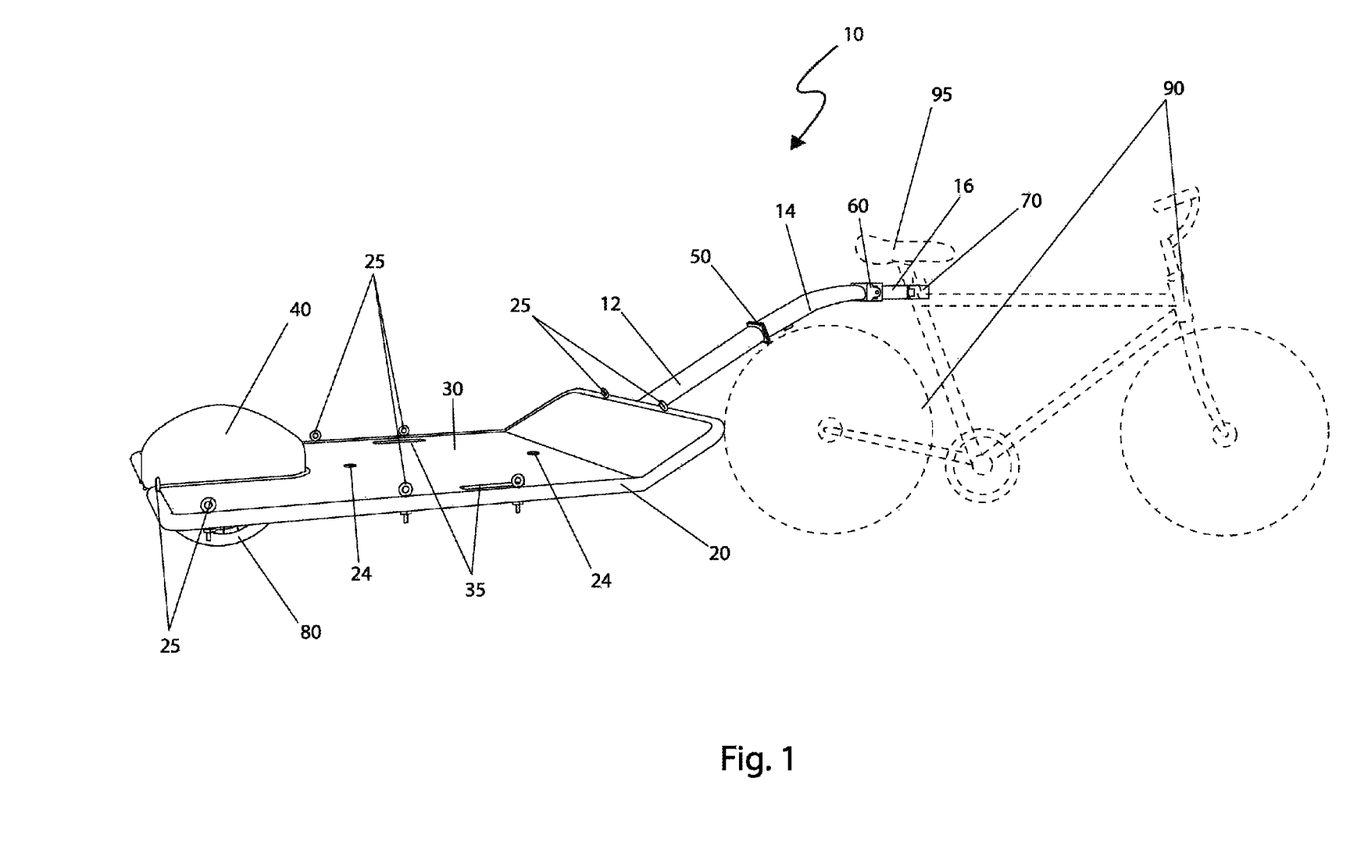
FIG. 1 is an environmental view of an attachable bicycle trailer 10 attached thereto a bicycle 90, according to a preferred embodiment of the present invention.

Referring now to FIG. 1, an environmental view of the apparatus 10 attached thereto a bicycle 90, according to the preferred embodiment of the present invention, is disclosed. The apparatus 10 comprises a first bar 12, a second bar 14, a third bar 16, a frame 20, a plurality of hooks 25, a platform 30, a fender 40, and a wheel 80. Said apparatus 10 comprises a frame 20, thereby providing a rigid structure for all other components to be fitted and mounted thereon. Said frame 20 takes the form of a tubular rectangular structure and is positioned low to the ground, thereby retaining a low center of gravity to provide stability during use. A front portion of the frame 20, closest to the bicycle 90, angles slightly upward, thereby providing clearance to a rear bicycle 90 tire. Said frame 20 is preferably a one (1) inch diameter measuring approximately thirty-two-and-a-half (32½) inches in length and approximately twenty-one (21) inches in width.

Said frame 20 comprises a plurality of hooks 25, thereby providing an attachment means to rope, bungee cords, or the like to secure cargo onto the apparatus 10. The hooks 25 are conventional threaded eye bolts inserted therethrough the frame 30 and are equidistantly spaced along said frame 20. The hooks 25 are secured to an underside of the frame therewith hook fasteners 26 which are preferably nuts threaded onto the hooks 25 (see FIGS. 2 and 3).

The apparatus 10 also comprises a platform 30 which is suspended on an upper surface of the frame 20, thereby providing a deck to position a variety of cargo items thereon. Said platform 30 comprises a pair of hand apertures 35, thereby providing a gripping means to the apparatus 10 for a lifting and a storage means. Said hand apertures 35 are located on each side portion of the platform 30 at an intermediate location. The platform 30 is similar thereto the shape of the frame 20 and is fastened to said frame 20 therewith a pair of first bar fasteners 24 (also see FIG. 2). Said first bar fasteners 24 are preferably a combination of bolts and nuts, yet other fastening devices may be incorporated therewithout limiting the functions of the apparatus 10. Said platform 30 is fabricated from a plastic or nylon composite material approximately one-quarter (¼) of an inch thick.

The apparatus 10 further comprises an arcuate fender 40, thereby providing a barrier to partially encompass a wheel 80 and prevent water and debris from coming in contact with the cargo as like conventional fenders thereon motor vehicles. The wheel 80 is a conventional quick-connect bicycle tire approximately fourteen (14) inches in diameter. The fender 40 is fabricated from a material similar thereto the platform 30 and is attached to the frame 20 with fender fasteners 41 (see FIG. 3) which are preferably screws; however, other fastening devices may be incorporated therewithout limiting the functions of the apparatus 10. Said fender 40 is located thereon a rear upper portion of the apparatus 10.

The apparatus 10 further comprises three (3) tubular bars 12, 14, 16, thereby providing a hinging means, a pivoting means, and an attachment means to the bicycle 90. A first bar 12 is attached to an underside portion of the frame 20 in a parallel manner therewith welding 100, yet other fastening means may be incorporated (see FIG. 2). Said first bar 12 extends upwardly at an angle and is attached, also by welding 100, to an end portion of a quick release hinge 50 (see FIGS. 4A and 4B), thereby providing a hinging and folding means to the apparatus 10. An opposite end portion of the quick-release hinge 50 is attached to a slightly curved second bar 14 therewith similar welding 100 techniques. An opposite end portion of the second bar 14 is attached to a universal joint 60 (see FIG. 5) therewith welding 100, thereby providing a pivoting means to the apparatus 10. An opposite end portion of the universal joint 60 is attached to a horizontal third bar 16 therewith welding 100. Said third bar is attached to a clamping collar (also see FIG. 5), thereby providing an attachment meant to a lower seat portion 95 thereon the bicycle 90. Said tubular bars 12, 14, 16 are fabricated from durable rust-resistant material such as, but not limited to: aluminum, stainless steel, coated steel, or the like and may comprise a weather resistant finish.

Figure 2:
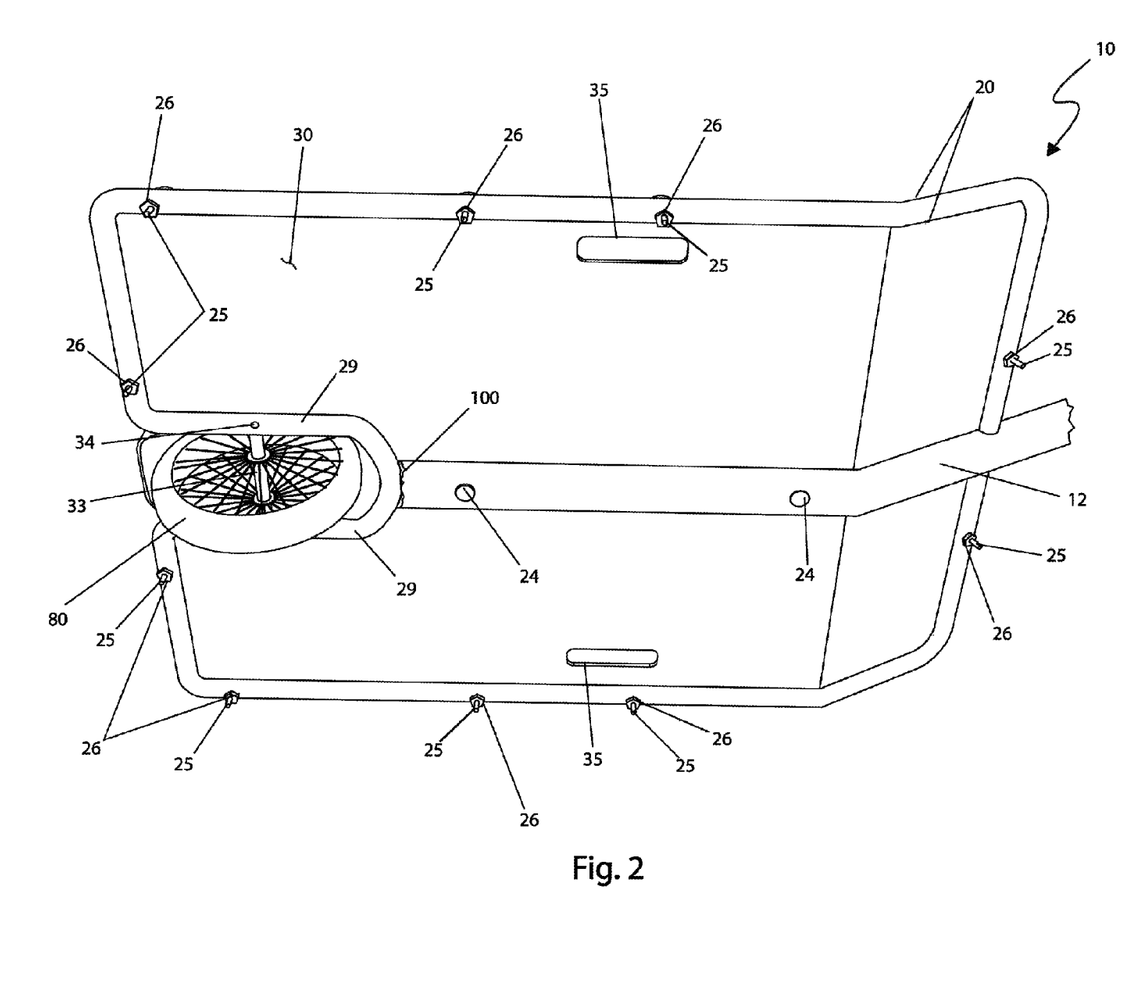
FIG. 2 is a perspective view of the attachable bicycle trailer 10 depicting an undercarriage portion, according to a preferred embodiment of the present invention.
Figure 3:
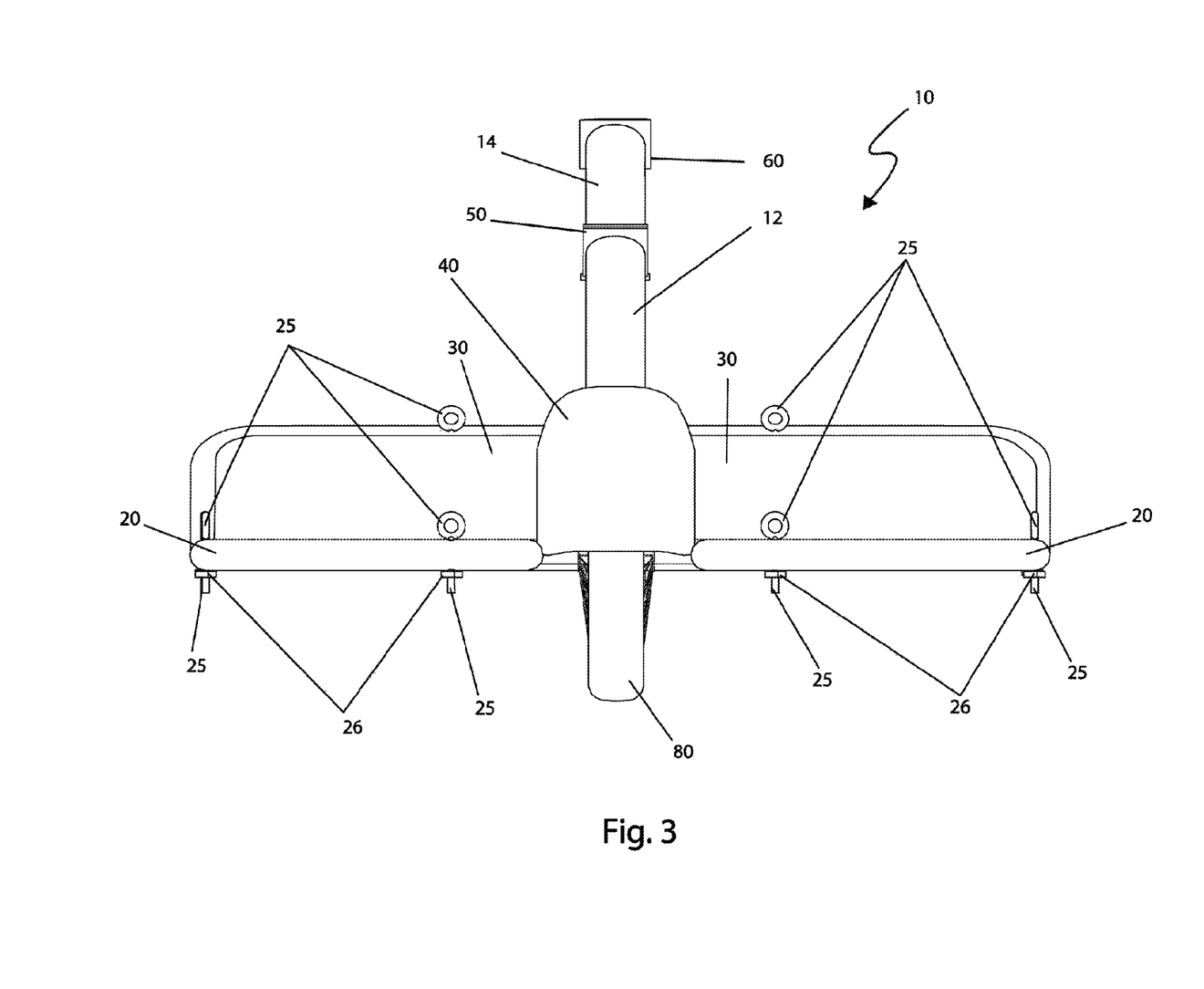
FIG. 3 is a front view of the attachable bicycle trailer 10, according to a preferred embodiment of the present invention.

Referring now to FIG. 2, a perspective view of the apparatus 10 depicting an undercarriage portion and FIG. 3, a front view of the apparatus 10, according to the preferred embodiment of the present invention, are disclosed. The apparatus 10 comprises a first bar 12, a pair of forks 29, an axle 33, and a wheel 80. The first bar 12 provides structural stability and an attachment means to the apparatus 10. Said first bar 12 is attached to an intermediate vertical position thereon the platform 30 therewith first bar fasteners 24 and is fabricated from a durable rust-resistant material such as, but not limited to: aluminum, stainless steel, or the like. Said first bar fasteners 24 are preferably bolts and nuts, yet other fastening devices may be incorporated therewithout limiting the functions of the apparatus 10. Said first bar 12 provides an attachment means to a pair of tubular forks 29 located on a lower rear portion of the underside of the apparatus 10. Each fork 29 is welded 100 to side portions of the frame and first bar 12, thereby providing additional support to the apparatus 10 and an attachment means to the axle 33. The first bar 12 also provides stability thereto the apparatus 10 during periods of rest or a stopped position, thereby allowing the weight of the apparatus 10 to rest thereupon said first bar 12. The forks 29 are preferably fabricated from materials similar thereto the first bar 12.

Each metal fork 29 provides an attachment means to the wheel 80. Said forks 29 are positioned downwardly parallel to the first bar 12 and provide an insertion means for the wheel 80 axle 33. Each end portion of said axle 33 is preferably partially threaded, thereby providing a fastening means thereto each fork 29. Each end portion of the axle 22 is secured to the forks 29 therewith a pair of axle fasteners 34. Said axle fasteners 34 are preferably threaded nuts, yet other fastening means may be utilized therewithout limiting the functions of the apparatus 10.

Figure 4A:
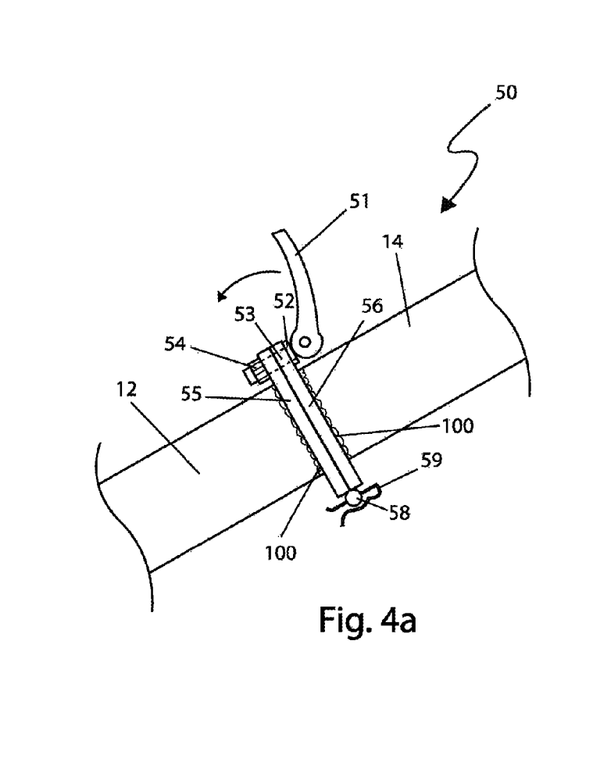
Figure 4B:
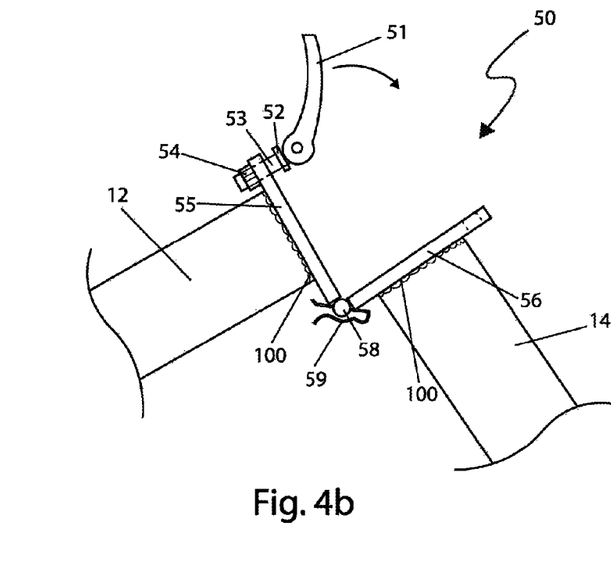

Referring now to FIG. 4A, a close-up view of a quick-release hinge 50 depicting a closed state and FIG. 4B close-up view of the quick-release hinge 50 depicting a deployed state, according to the preferred embodiment of the present invention, are disclosed. The apparatus 10 comprises a quick-release hinge 50, thereby allowing the second bar 14 and third bar 16 to detach from the first bar 12. Said hinge 50 provides a folding means, thereby condensing the apparatus 10 and enabling storage. Said quick-release hinge 50 is similar thereto conventional quick-release fasteners which provide a trouble-free locking and unlocking method. Said quick-release hinge 50 comprises a cam 51, a cam washer 52, a rod 53, a rod fastener 54, a pair of flanges 55, 56, a hinge pin 58, and a spring pin 59. Said quick-release hinge 50 is located therebetween the first bar 12 and second bar 14 and is attached to each bar 12, 14 therewith welding 100.

A first flange 55 is welded 100 to the first bar 12 and comprises an intermediately located aperture (not shown), thereby providing attachment means to the second flange 56 and insertion means to the rod 53. A second flange 56 is welded 100 to the second bar 14 and comprises an extruded "U"-shaped slot (not shown), thereby allowing the rod 53 to rest therein. The first flange 55 is connected to the second flange 56 by means of a conventional hinge pin 58, thereby providing rotation to the apparatus 10. Said hinge pin 58 is secured therewith a conventional spring pin 59.

A rod 53 therewith an integral cam 51 and cam washer 52 is inserted through the "U"-shaped slot thereon the second flange 56 and aperture thereon the first flange 55, thereby providing a secured state. To lock the quick-release hinge 50 the cam 51 is rotated downwardly, thereby allowing the cam washer 52 to slidably engage the second flange 56. To unlock the hinge 50 the cam 51 is rotated upwardly. The end portion of the rod 53 that is inserted through the first flange 55 is partially threaded and secured therewith a rod fastener 54 which is preferably a threaded nut, yet other fastening devices may be incorporated therewithout limiting the functions of the apparatus 10.

Figure 5:
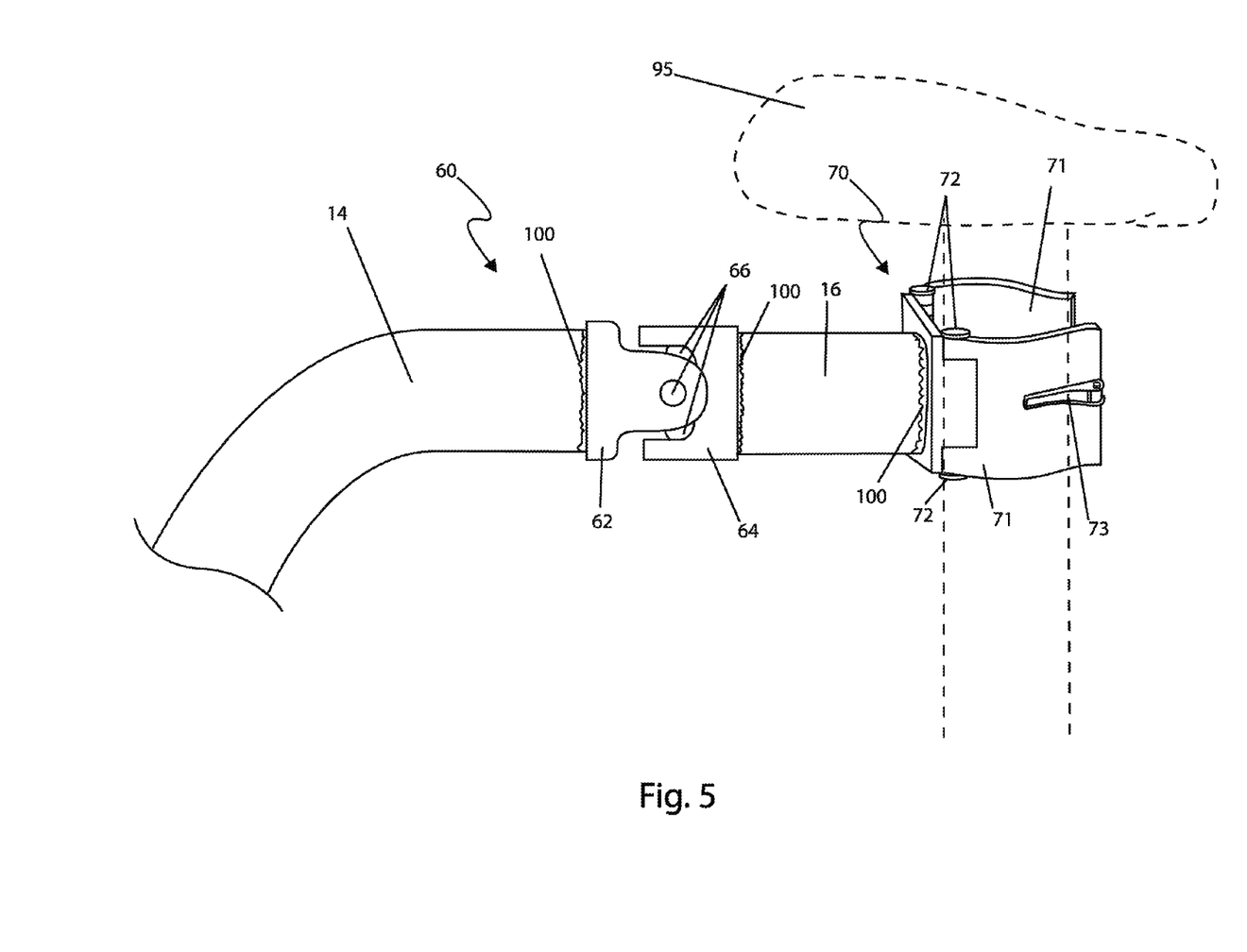
FIG. 5 is a close-up view a universal joint 60 and a clamping collar 70, according to a preferred embodiment of the present invention; and, FIG. 6 is a side view of the attachable bicycle trailer 10 depicting an enclosure accessory 85, according to a preferred embodiment of the present invention.

Referring now to FIG. 5, a close-up view a universal joint 60 and a clamping collar 70, according to the preferred embodiment of the present invention, are disclosed. Said universal joint 60 and clamping collar 70 provide a pivoting means to the apparatus 10 and an attachment means to the bicycle. The apparatus 10 pivots and moves therewith respect to the bicycle. Said universal joint 60 and clamping collar 70 are fabricated from metal materials such as, but not limited to: aluminum, stainless steel, or coated steel.

The apparatus 10 comprises the conventional universal joint 60, thereby providing the pivoting means to the apparatus 10. Said universal joint 60 comprises a first yoke 62, second yoke 64, and a joint 66. An end portion of the second bar 14 comprises a first yoke 62 and an end portion of the third bar 15 comprises a second yoke 64 each attached therewith welding 100 techniques. Each yoke 62, 64 is joined together therewith a joint 66. This combination of the yokes 64, 66 and joint 66 create the above-mentioned pivoting means.

The apparatus 10 also comprises a clamping collar 70, thereby providing the attachment means to the rear portion of the seat 95. Said clamping collar 70 is preferably a conventional quick-release cam action device which encompasses the tubular portion of the seat 95. Said clamping collar 70 comprises a pair of stationary collars 71, a plurality of hinges 72, and a cam lever 73. Each stationary collar 71 comprises an arcuate shape which may open and close thereto remove or attach the clamping collar 70 to the seat 95. The stationary collar 71 opens and closes via a plurality of conventional hinges 72. Said stationary collars 71 are attached therewith welding 100 methods to an end portion of the third bar 16, thereby encompassing a tubular portion of the lower seat 95 portion. The clamping collar 70 is secured therewith a conventional cam lever 73 which comprises a common digit operated lever and hinging means. Said cam lever 73 is rotated outwardly to open or remove the clamping collar 70 and rotated inwardly to close or attach said clamping collar 70.

Figure 6:
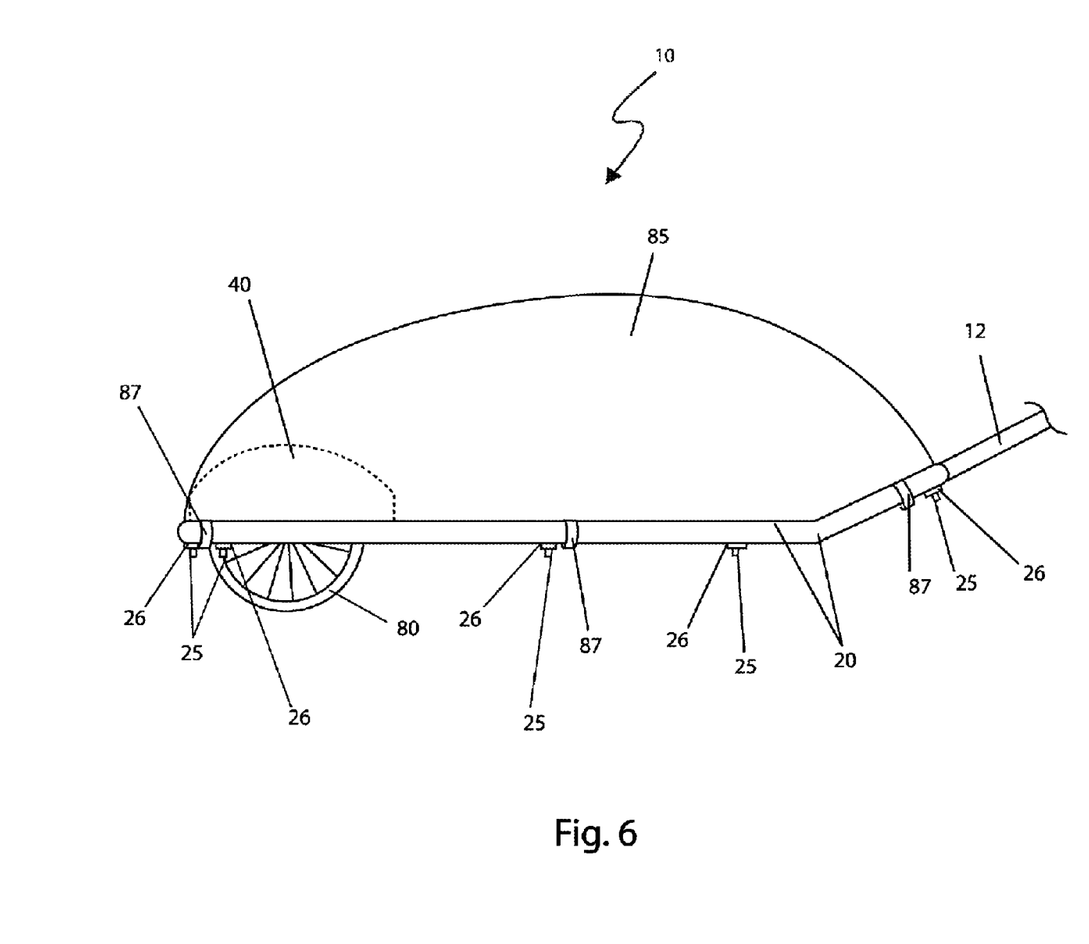

Referring now to FIG. 6, a side view of the apparatus 10 depicting an enclosure accessory 85, according to the preferred embodiment of the present invention, is disclosed. The apparatus 10 comprises a removably attachable housing 85, thereby providing a secure enclosure. Said housing 85 prevents the cargo from being damaged from undesirable weather conditions or other elemental conditions. Said housing 85 is preferably an aerodynamic dome-shape and fastens to the frame 20 therewith an appropriate housing fastening means 87 such as, but not limited to: clamps, bolts and nuts, or the like. Said housing 85 is preferably an aftermarket component available from manufactures which deal with goods of this type.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1 through 6.

The method of installing and utilizing the apparatus 10 may be achieved by performing the following steps: acquiring the apparatus 10; unfolding the quick-release hinge 50; locking said quick-release hinge 50, thereby mating each flange 55, 56 and rotating the cam 51 to a locked position; attaching the clamping collar 70 to the tubular portion therebelow the seat 95 thereon the bicycle 90, thereby encompassing the stationary collars 71, thereby rotating the hinges 72 and positioning therebelow said seat 95 portion and fastening therewith the cam lever 73; placing cargo thereon the platform 30 and securing with rope or bungee cords; as necessary, placing the housing 85 on top of the frame 20 and attaching with the housing fastening means 87 if desired; traveling to a desired destination while hauling the apparatus 10; and, enjoying the freedom of transporting cargo items while bicycling.

The method of uninstalling and storing the apparatus 10 may be achieved by performing the following steps: rotating the cam lever 73 thereby turning the hinges 72 and detaching the stationary collars 71 from the seat 95; unlocking the clamping collar 70 from the bicycle 90; rotating the cam 51, thereby freeing the second flange 56 and hinging the quick release hinge 50; folding the second bar 14 thereonto the first bar 12; utilizing the hand apertures 35 to lift the apparatus 10 to a desired location; and enjoying the ease of storing the apparatus 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A bicycle trailer for hauling cargo via a bicycle, said bicycle trailer comprising:
    a frame including a plurality of hooks connected thereto, said hooks adapted to receive a fastening cord for maintaining the cargo at a substantially stable position during transport;
    a platform suspended on an upper surface of said frame, said platform adapted to receive the cargo items thereon;
    a fender adapted to encompass a wheel of the bicycle trailer and thereby prevent water and debris from contacting the cargo;
    a first bar attached to an underside portion of said frame and extending upwardly therefrom;
    a second bar;
    a hinge connected to said first and second bars respectively;
    a universal joint connected to said second bar;
    a third bar connected to said universal joint;
    a clamping collar attached to said third bar, said clamping collar adapted to be attached to a seat portion of the bicycle; and,
    a plurality of forks and an axle attached thereto, said axle adapted to be coupled to the bicycle trailer wheel, said forks further being attached to said first bar.

2. The bicycle trailer of claim 1, wherein said forks are positioned parallel to said first bar and further are attached to end portions of said axle.

3. The bicycle trailer of claim 1, wherein said hinge is a quick-release hinge biased between open and closed positions such that said second bar is detachably engaged with said first bar.

4. The bicycle trailer of claim 3, wherein said quick-release hinge comprises:
    a first flange coupled to said first bar;
    a second flange coupled to said second bar;
    a rod positioned through said first and second flanges;
    a cam and a cam washer attached to said rod; and,
    a hinge pin mated to said first and second flanges respectively;
    a spring pin attached to said hinge pin for maintaining said first and second flanges at a pivotal relationship;
    wherein said cam is rotated downwardly to a locked position and thereby slidably engaged with said cam washer to second flange; and,
    wherein said cam is rotated upwardly to an unlocked position and thereby retracts said rod from said second flange.

5. The bicycle trailer of claim 1, wherein said universal joint and said clamping collar are adapted to pivot and move with the bicycle.

6. The bicycle trailer of claim 1, wherein said universal joint comprises:
- a first yoke attached to an end portion of said second bar;
- a second yoke attached to an end portion of said third bar; and,
- a joint connected to said first and second yokes respectively.

7. The bicycle trailer of claim 1, wherein said clamping collar comprises:
- a plurality of arcuate stationary collars having a plurality of hinges connected to each other, said arcuate stationary collars being attached to said third bar and further adapted to be removably attached to the bicycle seat portion; and,
- a cam lever attached to said clamping collar and being rotated outwardly and inwardly between open and closed positions respectively.

8. A bicycle trailer for hauling cargo via a bicycle, said bicycle trailer comprising:
- a frame including a plurality of hooks connected thereto, said hooks adapted to receive a fastening cord for maintaining the cargo at a substantially stable position during transport;
- a platform suspended on an upper surface of said frame, said platform adapted to receive the cargo items thereon, said platform being provided with a plurality of hand apertures formed therein for assisting a user to lift said frame;
- a fender adapted to encompass a wheel of the bicycle trailer and thereby prevent water and debris from contacting the cargo;
- a first bar attached to an underside portion of said frame and extending upwardly therefrom;
- a second bar;
- a hinge connected to said first and second bars respectively;
- a universal joint connected to said second bar;
- a third bar connected to said universal joint;
- a clamping collar attached to said third bar, said clamping collar adapted to be attached to a seat portion of the bicycle; and,
- a plurality of forks and an axle attached thereto, said axle adapted to be coupled to the bicycle trailer wheel, said forks further being attached to said first bar.

9. The bicycle trailer of claim 8, wherein said forks are positioned parallel to said first bar and further are attached to end portions of said axle.

10. The bicycle trailer of claim 8, wherein said hinge is a quick-release hinge biased between open and closed positions such that said second bar is detachably engaged with said first bar.

11. The bicycle trailer of claim 10, wherein said quick-release hinge comprises:
- a first flange coupled to said first bar;
- a second flange coupled to said second bar;
- a rod positioned through said first and second flanges;
- a cam and a cam washer attached to said rod; and,
- a hinge pin mated to said first and second flanges respectively;
- a spring pin attached to said hinge pin for maintaining said first and second flanges at a pivotal relationship;
- wherein said cam is rotated downwardly to a locked position and thereby slidably engaged with said cam washer to second flange; and,
- wherein said cam is rotated upwardly to an unlocked position and thereby retracts said rod from said second flange.

12. The bicycle trailer of claim 8, wherein said universal joint and said clamping collar are adapted to pivot and move with the bicycle.

13. The bicycle trailer of claim 8, wherein said universal joint comprises:
- a first yoke attached to an end portion of said second bar;
- a second yoke attached to an end portion of said third bar; and,
- a joint connected to said first and second yokes respectively.

14. The bicycle trailer of claim 8, wherein said clamping collar comprises:
- a plurality of arcuate stationary collars having a plurality of hinges connected to each other, said arcuate stationary collars being attached to said third bar and further adapted to be removably attached to the bicycle seat portion; and,
- a cam lever attached to said clamping collar and being rotated outwardly and inwardly between open and closed positions respectively.

15. A method of utilizing a bicycle trailer for hauling cargo via a bicycle, said method comprising the steps of:
- providing a frame including a plurality of hooks connected thereto;
- providing and suspending a platform on an upper surface of said frame, said platform being provided with a plurality of hand apertures formed therein for assisting a user to lift said frame;
- providing and attaching a first bar to an underside portion of said frame such that said first bar extends upwardly from said frame;
- providing a second bar;
- providing and connecting a hinge to said first and second bars respectively;
- providing and connecting a universal joint to said second bar;
- providing and connecting a third bar to said universal joint;
- providing and attaching a clamping collar to said third bar;
- attaching said clamping collar to a seat portion of the bicycle;
- providing and attaching a plurality of forks to said first bar;
- providing and attaching an axle to said forks;
- coupling said axle to a wheel of the bicycle trailer;
- positioning the cargo onto said platform;
- preventing water and debris from contacting the cargo by providing and encompassing a fender over the bicycle trailer wheel; and,
- maintaining the cargo at a substantially stable position during transport by providing and connecting a fastening cord to said hooks.

* * * * *